US011860335B2

(12) United States Patent
Yang et al.

(10) Patent No.: US 11,860,335 B2
(45) Date of Patent: Jan. 2, 2024

(54) LASER SOURCE APPARATUS WITH MULTIPLE PLATE CONTINUUM AND MEASUREMENT SYSTEM THEREWITH

(71) Applicant: NATIONAL TSING HUA UNIVERSITY, Hsinchu (TW)

(72) Inventors: Shang-Da Yang, Hsinchu (TW); Chih-Hsuan Lu, Pingtung County (TW); Jhan-Yu Guo, Tainan (TW); Chao-Yang Lin, Taipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 231 days.

(21) Appl. No.: 17/180,851

(22) Filed: Feb. 21, 2021

(65) Prior Publication Data
US 2022/0035172 A1 Feb. 3, 2022

(30) Foreign Application Priority Data
Jul. 31, 2020 (TW) .................................. 109126109

(51) Int. Cl.
G02B 27/10 (2006.01)
G01J 3/26 (2006.01)
G02F 1/37 (2006.01)

(52) U.S. Cl.
CPC .............. *G02B 27/106* (2013.01); *G01J 3/26* (2013.01); *G02F 1/37* (2013.01)

(58) Field of Classification Search
CPC ............. G02B 27/106; G01J 3/26; G02F 1/37
See application file for complete search history.

(56) References Cited

U.S. PATENT DOCUMENTS 4,035,080 A * 7/1977 Yamaguchi ............... G01J 3/26
356/454
5,451,785 A * 9/1995 Faris ................... G01N 21/4795
250/358.1
(Continued)

FOREIGN PATENT DOCUMENTS

TW  201622280 A  6/2016

OTHER PUBLICATIONS

Ronnie R. Tamming et al., 'Multiple-Plate Compression used in Transient Absorption Spectroscopy, The 14th Pacific Rim Conference on Lasers and Electro-Optics (CLEO PR 2020), dated on Aug. 3-5, 2020, 3 pages, paper, Australia.

*Primary Examiner* — Tarifur R Chowdhury
*Assistant Examiner* — Kemaya Nguyen
(74) *Attorney, Agent, or Firm* — CKC & Partners Co., LLC

(57) ABSTRACT

A laser source apparatus is for providing a beam path to generate a first laser beam and a second laser beam. The laser source apparatus includes a laser generator, at least one spectrum broadening unit and a beam splitter on the beam path. The laser generator is configured to generate an original laser beam with a pulse duration smaller than 1 ps. The spectrum broadening unit is configured in a following stage of the laser generator. The spectrum broadening unit includes a multiple plate continuum. The multiple plate continuum includes a plurality of thin plates, and the thin plates are configured along the beam path in order. The beam splitter is configured in the following stage of the laser generator to divide the original laser beam into the first laser beam and the second laser beam.

18 Claims, 14 Drawing Sheets

(56) References Cited

U.S. PATENT DOCUMENTS

| | | | |
|---|---|---|---|
| 8,253,937 B2* | 8/2012 | Krishnamachari | G01N 21/63 356/301 |
| 2008/0315098 A1* | 12/2008 | Itsuji | H01L 31/09 250/330 |
| 2017/0082909 A1* | 3/2017 | Kung | G02F 1/3501 |

* cited by examiner

LASER SOURCE APPARATUS WITH MULTIPLE PLATE CONTINUUM AND MEASUREMENT SYSTEM THEREWITH

RELATED APPLICATIONS

This application claims priority to Taiwan Application Serial Number 109126109, filed Jul. 31, 2020, which is herein incorporated by reference.

BACKGROUND

Technical Field

The present disclosure relates to a laser source apparatus and a measurement system. More particularly, the present disclosure relates to a laser source apparatus with a multiple plate continuum and a measurement system therewith.

Description of Related Art

Ultrafast spectroscopy is an important tool for novel material characterizations and fundamental science analyses. In a conventional technique of spectroscopy, it needs two different sets of optical devices or elements to establish beam paths of a pump beam (an excitation beam) and a probe beam, respectively, based on respect required characteristics of the pump beam and the probe beam. For example, the pump beam is usually provided by a wavelength conversion device, e.g., double frequency conversion device, triple frequency conversion device, optical parametric amplifier (OPA), optical parametric oscillator, etc., while the probe beam is provided to focus on a bulk crystal to generate a supercontinuum.

However, the conventional laser source apparatus employing the above technique still has other problems that need to be improved. For example, a broadband gain medium cannot be directly pumped by a diode laser to emit a beam at specific absorption band. At present, it still relies on the technique of solid-state lasers and double frequency modules to pump. It results in an average power limited to about ten watts and a pulse repetition rate about several kHz (kilohertz), so that the signal-to-noise ratio is restricted due to insufficient photon flux, the measurement time is lengthened due to the low repetition rate, and thereby it is unfavorable for most applications. Furthermore, the pump beam of the ultrafast spectroscopy needs short pulses with a tunable center wavelength over a wide range. The most popular wavelength conversion device is the optical parametric amplifier, but the supported bandwidth is generally only about tens of nm (nanometer), and it is necessary to accurately tune the crystal angle to meet the phase matching condition while switching to the required wavelength. Thus, the system is very sensitive to the optical path and beam pointing. It requires long-term and frequent maintenance by experts, so that it is disadvantageous in quickly switching wavelengths and interdisciplinary applications. On the other hand, though focusing the ultrashort pulse onto a bulk crystal can induce strong nonlinear effect to generate a supercontinuum as the probe beam of ultrafast spectroscopy, the beam has self-focusing characteristics due to the spatial Kerr effect. Hence, the power density of the beam increases with the transmission distance so as to eventually damage the bulk crystal. Accordingly, the upper limit of the input pulse energy is limited by the damage threshold of the bulk crystal so as to limit the pulse energy of the output supercontinuum and the signal-to-noise ratio of measurement.

In short, due to the weak transient absorption signals, the signal-to-noise ratio can only be improved after averaging multiple pulse shots. The laser repetition rate determines the number of shots per second, and thereby it usually results in a long measurement time. Furthermore, a laser of better stability is required for a longer measurement time. Thus, besides the excessively long measurement time, more serious noise problems occur.

Given the above, in today's ultrafast spectroscopy market, there is an urgent need to develop a laser source apparatus and a measurement system, which are featured with a short duration, a wide bandwidth, a high repetition rate and a large spectral energy density, and reducing the configuration (setup) complexity of the beam path.

SUMMARY

According to one aspect of the present disclosure, a laser source apparatus is for providing a beam path to generate a first laser beam and a second laser beam. The laser source apparatus includes a laser generator, at least one spectrum broadening unit and a beam splitter on the beam path. The laser generator is configured to generate an original laser beam with a pulse duration smaller than 1 ps. The spectrum broadening unit is configured in a following stage of the laser generator. The spectrum broadening unit includes a multiple plate continuum. The multiple plate continuum includes a plurality of thin plates, and the thin plates are configured along the beam path in order. The beam splitter is configured in the following stage of the laser generator to divide the original laser beam into the first laser beam and the second laser beam.

According to another aspect of the present disclosure, a measurement system is for providing a beam path to generate a first laser beam and a second laser beam. At least one of the first laser beam and the second laser beam is configured to be incident on a sample. The measurement system includes a laser generator, at least one spectrum broadening unit, a beam splitter and a sample position. The laser generator is configured to generate an original laser beam with a pulse duration smaller than 1 ps. The spectrum broadening unit is configured in a following stage of the laser generator. The spectrum broadening unit includes a multiple plate continuum. The multiple plate continuum includes a plurality of thin plates, and the thin plates are configured along the beam path in order. The beam splitter is configured in the following stage of the laser generator to divide the original laser beam into the first laser beam and the second laser beam. The sample position is configured in a following stage of the at least one spectrum broadening unit and the beam splitter. The sample position is for disposing the sample.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiments, the practical details is unnecessary. In addition, for simplifying the drawings, some conventional structures and elements will be simply illustrated, and repeated elements may be represented by the same labels.

Figure 1A:
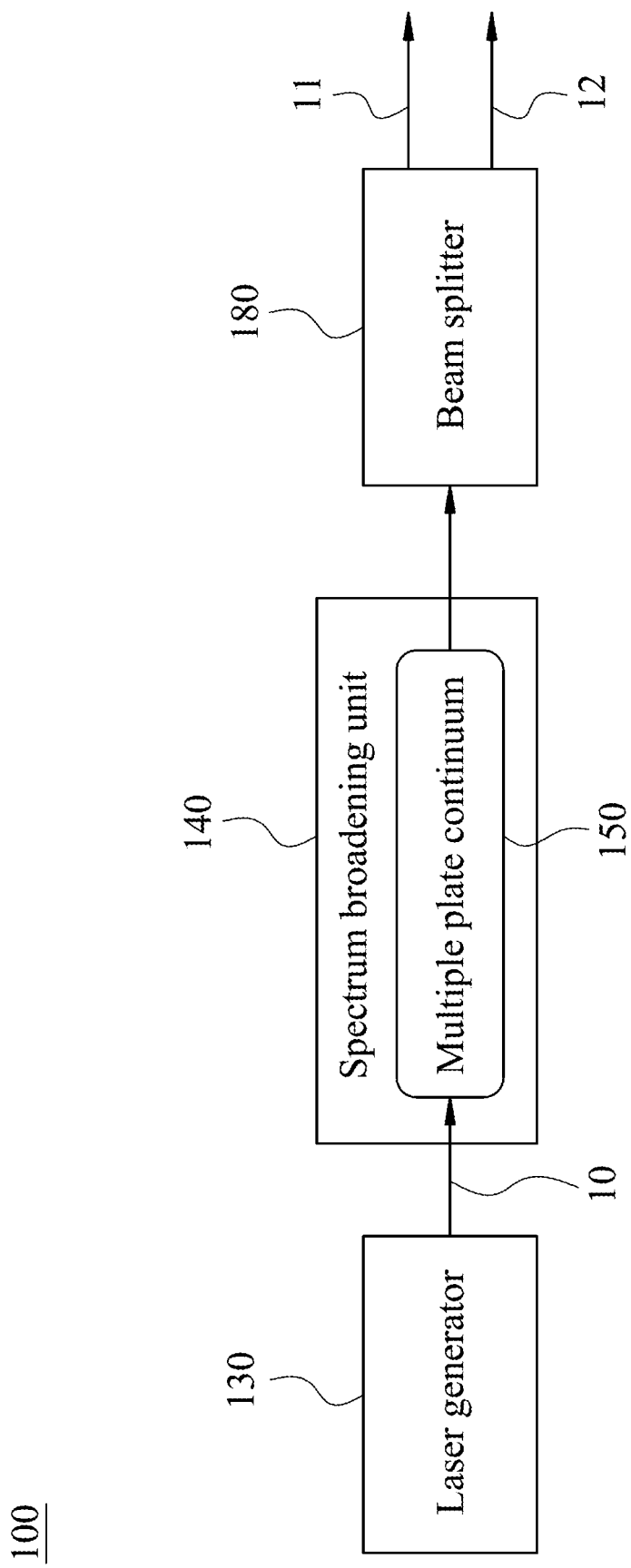
FIG. 1A is a block diagram of a laser source apparatus according to the 1st embodiment of the present disclosure.

FIG. 1A is a block diagram of a laser source apparatus 100 according to the 1st embodiment of the present disclosure, and also a schematic view of the laser source apparatus 100, which is configured to generate a first laser beam 11 and a second laser beam 12. With reference to FIG. 1A, the laser source apparatus 100 is for providing a beam path (label omitted) to generate the first laser beam 11 and the second laser beam 12. The laser source apparatus 100 includes a laser generator 130, a spectrum broadening unit 140 and a beam splitter (pulse splitter) 180 on the beam path.

The laser generator 130 is configured to generate an original laser beam 10 with a pulse duration smaller than 1 ps (picosecond). The spectrum broadening unit 140 is configured in a following stage of the laser generator 130. The spectrum broadening unit 140 includes a multiple plate continuum (MPC) 150. The multiple plate continuum 150 includes a plurality of thin plates 155 and is configured to broaden a spectrum. The thin plates 155 are configured with Brewster's angles along the beam path in order, that is, configured in series with Brewster's angles along a propagation direction of a light beam, as shown in FIG. 6B. The beam splitter 180 is configured in the following stage of the laser generator 130 to divide the original laser beam 10 into the first laser beam 11 and the second laser beam 12. Therefore, the proper laser generator 130 can be selected to generate the original laser beam 10 of a high repetition rate of the pulse duration smaller than 1 ps. The multiple plate continuum 150 with the solid-state spectrum broadening mechanism is configured to generate a supercontinuum, so that the first laser beam 11 and the second laser beam 12 emitted from the laser source apparatus 100 are featured with short pulses, high repetition rates, high brightness and broadband, that is, have good light source qualities to be further widely applied in different fields. Furthermore, the laser source apparatus 100 is advantageous in preventing from a configuration complexity of preparing two sets including different optical devices or elements to respectively provide two laser beams, so as to have the characteristics of simplicity, exquisiteness and economy. In addition, the laser generator 130 may be configured to generate the original laser beam 10 with the pulse duration smaller than 500 fs (femtosecond). In other laser source apparatus according to the present disclosure (not shown in drawings), the laser source apparatus may be for providing a beam path to generate at least three laser beams (a first laser beam, a second laser beam, a third laser beam or more laser beams).

In the 1st embodiment, the laser generator 130 with a gain medium doped with Yb (Ytterbium) is configured to generate the original laser beam 10 with the pulse duration smaller than 1 ps. The amplified energy density or intensity of the original laser beam 10 is beneficial to the first laser beam 11 and the second laser beam 12 to achieve a higher average power, so as to support pulse trains with repetition rates of tens of kHz (kilohertz) to one MHz (Megahertz), but the repetition rates are not limited thereto. The high photon flux of the original laser beam 10 is advantageous in increasing the signal-to-noise ratio and shortening the measurement time so as to establish an ultrafast spectroscopy measurement platform with a high average power, a high repetition rate, and simply and fast tuning the working wavelength. In addition, a laser generator of a laser source apparatus according to the present disclosure may be a fiber laser, a Ti: sapphire laser, or have a gain medium doped with Ho (Holmium) to generate an original laser beam with a pulse duration smaller than 1 ps, but not limited thereto.

Moreover, the supercontinuum generation technology of the multiple plate continuum is based on the solid-state spectrum broadening mechanism. In order to solve the self-focusing damage caused by a single bulk for spectrum broadening in the conventional technique, several thin plates (crystals) with thicknesses ranged from ten micrometers to several mm (millimeter) are configured on the beam path to be incident by the laser pulses. The interval between any two of the thin plates is about several mm to several cm (centimeter) in accordance with the initial conditions. The multiple plate continuum is advantageous in low input pulse energy requirements and high output beam coherence as a spectrum broadening mechanism of the single bulk crystal. Simultaneously, the multiple plate continuum facilitates the focus of the self-focusing outside the thin plates, so as the spectrum of the laser beam is broadened in series after laser beam diverging outside the thin plates without damaging the thin plates and then being incident on a next thin plate. Thus, a wide-band supercontinuum with a wavelength range of hundreds of nanometers can be provided. The pulse energy generated by the multiple plate continuum may be ranged from several micro-Joules to several mJ (millijoule), and the supercontinuum is featured with a compressibility in the time domain for a high time resolution. The multiple plate continuum is advantageous in a simple structure, no need of frequent maintenances by specialized users, easily and quickly switching bands, and insensitivity to beam pointing, so as to suit a long-term measurement.

Figure 1B:
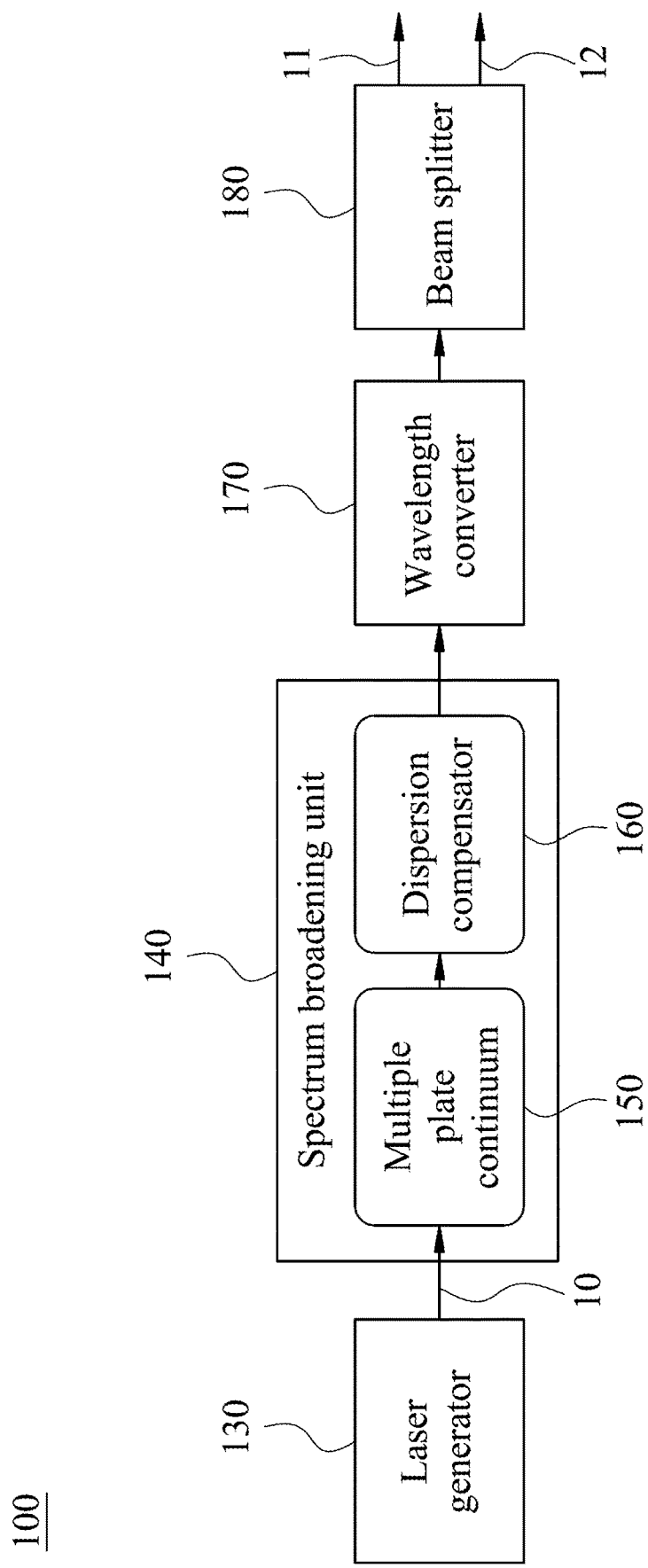
FIG. 1B is another block diagram of the laser source apparatus according to the 1st embodiment.

FIG. 1B is a more specific block diagram of the laser source apparatus 100 according to the 1st embodiment. With reference to FIG. 1B, the spectrum broadening unit 140 may include the multiple plate continuum 150 and a dispersion compensator 160 along the beam path in order. The multiple plate continuum 150 and the dispersion compensator 160 are for pulse compression, that is, for shortening the pulse duration. Therefore, it is beneficial to compress the pulse durations of the first laser beam 11 and the second laser beam 12 passed from the dispersion compensator 160 to the order of several periods. The multiple plate continuum 150 and the dispersion compensator 160 cooperated are favorable for shortening the pulse duration, so as to increase the resolution in the time domain, have wide pulse bandwidth, and induce non-linear effects.

The laser source apparatus 100 may further include a wavelength converter 170 on the beam path. The wavelength converter 170 is configured in the following stage of the laser generator 130 and to convert the spectrum. Accordingly, a specific wavelength in the spectrum of at least one of the first laser beam 11 and the second laser beam 12 can be converted to second harmonic or difference frequency (not limited thereto) while the continuous spectrum still remained.

The beam splitter 180 may be a surface reflector, an interferometer, or a beam splitter. The wavelength converter 170 may be a second harmonic generator (SHG). Accordingly, it can prevent from the engineering difficulty of accurately phase matching, so as to reduce the configuration complexity of the beam path of the laser source apparatus 100. In the 1st embodiment, the beam splitter 180 is specifically the surface reflector, and the wavelength converter 170 is specifically the second harmonic generator. In addition, a beam splitter of a laser source apparatus according to the present disclosure may also be a spatial light modulator (SLM) or a birefringence crystal. A wavelength converter thereof may also be an optical parametric amplifier, a sum frequency generator (SFG), a difference frequency generator (DFG), or an element applying Raman scattering.

Figure 1C:
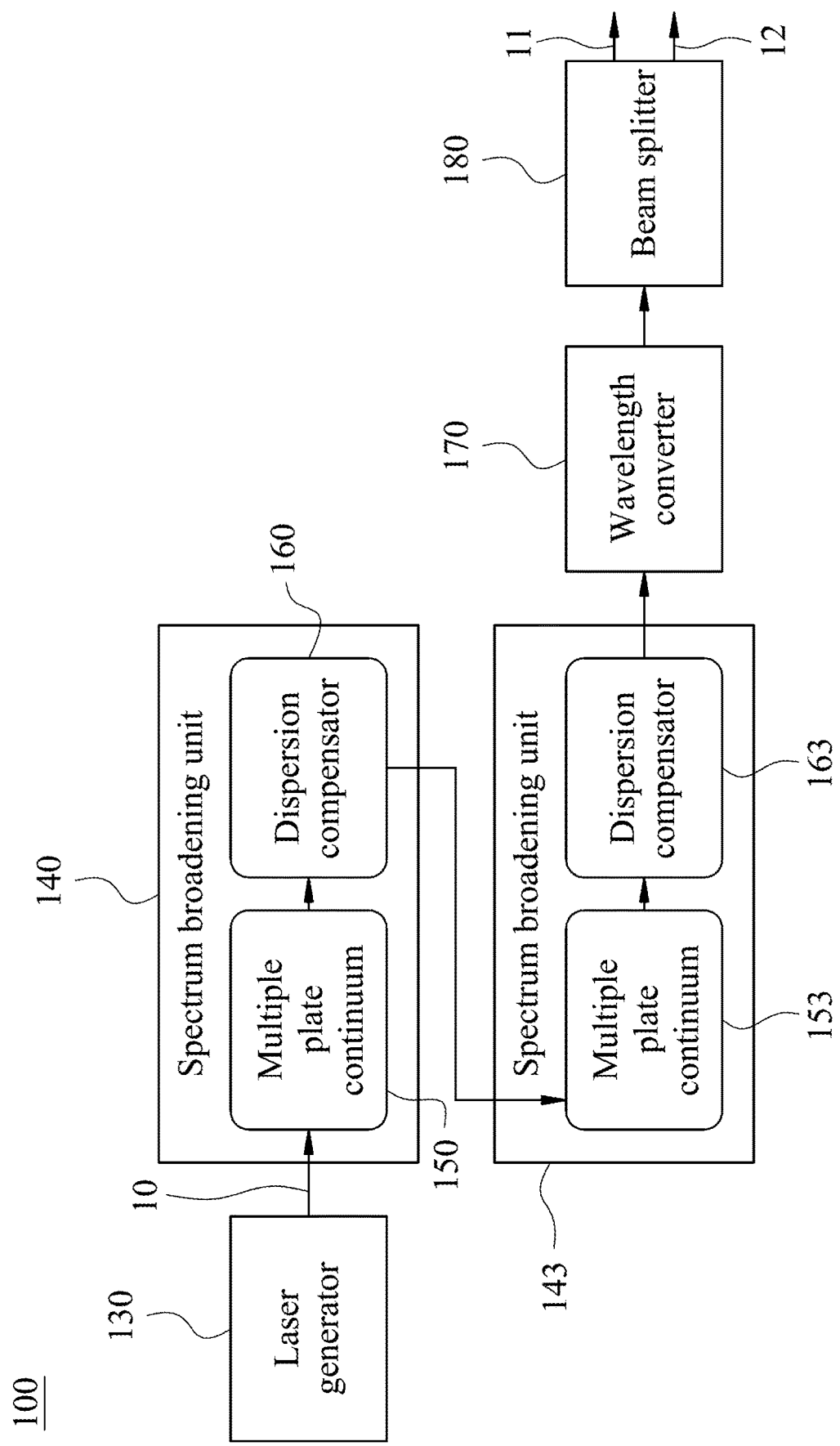
FIG. 1C is further another block diagram of the laser source apparatus according to the 1st embodiment.

FIG. 1C is a further more specific block diagram of the laser source apparatus 100 according to the 1st embodiment. With reference to FIG. 1C, a number of the at least one spectrum broadening unit is at least two, and the two spectrum broadening units are specifically spectrum broadening units 140, 143, respectively. That is, the number of the spectrum broadening units is specifically two, and the spectrum broadening units 140, 143 are configured along the beam path in order. Therefore, multiple spectrum broadening units (e.g., the spectrum broadening units 140, 143) configured along the beam path in order are advantageous in gradually facilitating a laser beam with a smaller pulse duration and a wider and more uniform spectrum. In other embodiment according to the present disclosure (not shown in drawings), specifically, a number of at least one spectrum broadening unit of a laser source apparatus may be one. Alternately, a number of at least one spectrum broadening unit of a laser source apparatus may be at least three, and the at least three spectrum broadening units are configured along a beam path in order.

Figure 1D:
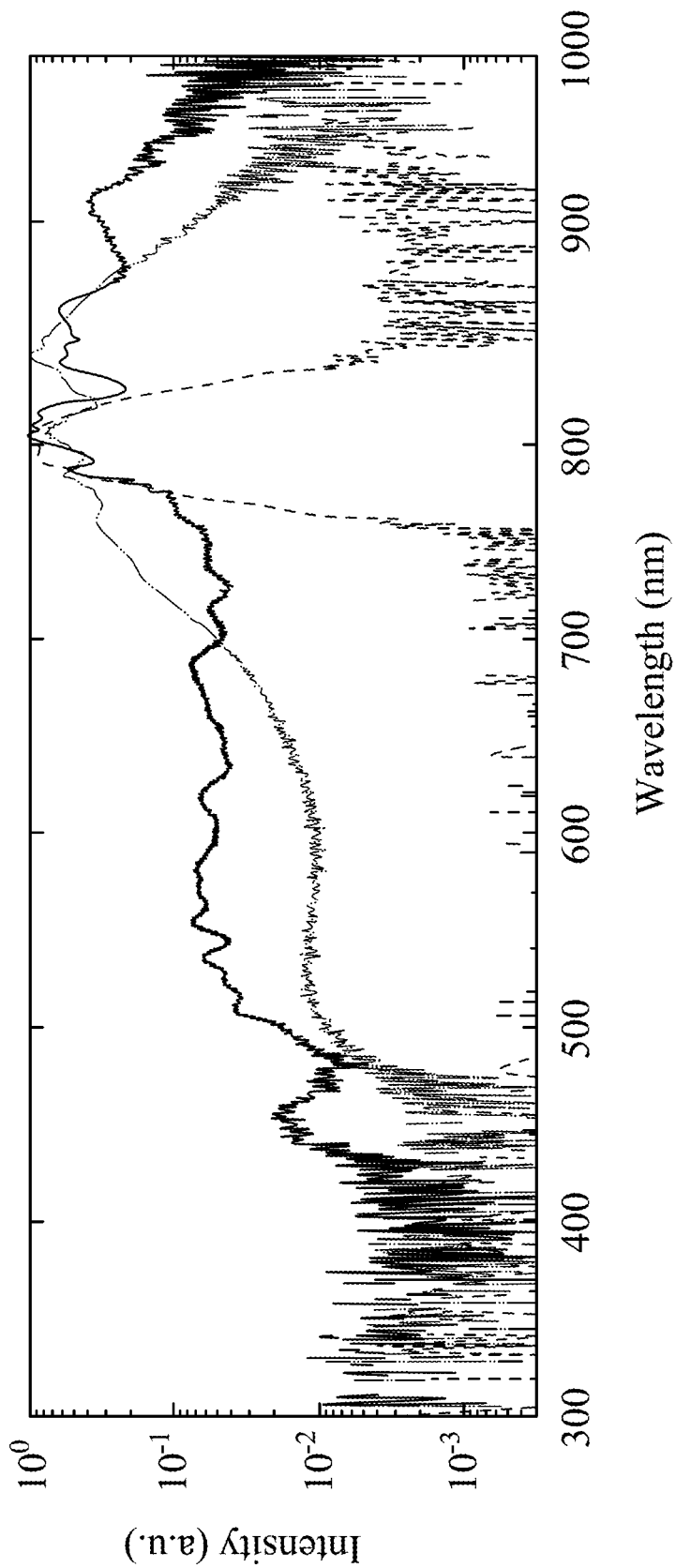
FIG. 1D is a spectrum diagram of the laser source apparatus according to the 1st embodiment.

FIG. 1D is a spectrum diagram of the laser source apparatus 100 according to the 1st embodiment. In the spectrum diagram of FIG. 1D, the horizontal axis represents wavelength, and the vertical axis represents intensity. For example, the data curves in FIG. 1D represent the intensity of each wavelength of the original laser beam 10 emitted from the laser generator 130 and the spectrum broadening units 140, 143, respectively. With reference to FIG. 1D, a spectrum of the original laser beam 10 emitted from the spectrum broadening unit 140 is wider than a spectrum thereof emitted from the laser generator 130, and a spectrum of the original laser beam 10 emitted from the spectrum broadening unit 143 (the second spectrum broadening unit) is further wider and more uniform.

With reference to FIG. 1C, the beam splitter 180 may be configured in a following stage of the spectrum broadening units 140, 143 and the wavelength converter 170. Accordingly, the first laser beam 11 and the second laser beam 12 with similar wavelengths can be provided by the beam path and the devices or elements therein with lower complexity.

In FIG. 1C of the 1st embodiment, the laser source apparatus 100 includes the laser generator 130, the spectrum broadening units 140, 143, the wavelength converter 170 and the beam splitter 180 along the beam path in order. The spectrum broadening unit 140 includes the multiple plate continuum 150 and the dispersion compensator 160 along the beam path in order. The spectrum broadening unit 143 includes a multiple plate continuum 153 and a dispersion compensator 163 along the beam path in order. Each of the multiple plate continuums 150, 153 includes a plurality of thin plates 155 and is configured to broaden a spectrum. The thin plates 155 of each of the multiple plate continuums 150, 153 are configured with Brewster's angles along the beam path in order. The original laser beam 10 is divided into the first laser beam 11 and the second laser beam 12 after passing through the beam splitter 180. Moreover, it should be understood that optical properties (e.g., pulse durations, spectrums, intensities, etc.) of each of the original laser beam 10, the first laser beam 11 and the second laser beam 12 emitted from (after passing through) different optical elements (different nodes) on the beam path may be different.

Each of the dispersion compensators 160, 163 may be a chirped mirror. Accordingly, it is beneficial to reduce the configuration complexity of the beam path of the laser source apparatus 100. In the 1st embodiment, each of the dispersion compensators 160, 163 is specifically the chirped mirror. In addition, a dispersion compensator of a laser source apparatus according to the present disclosure may also be a prism, a grating, or a dispersion material with an ability to compensate phase.

The laser source apparatus 100 may be for providing each of a terminal (an end) of the first laser beam 11 and a terminal of the second laser beam 12 with a pulse duration smaller than 300 fs. Alternately, a compression factor of the laser source apparatus 100 may be greater than 3. The said compression factor is a ratio of the pulse duration provided by the laser generator 130 to one of the pulse durations of the terminals of the first laser beam 11 and the second laser beam 12. Therefore, the laser source apparatus 100 with lower complexity is advantageous in providing applications of short pulse and supercontinuum. Furthermore, the laser source apparatus 100 may be for providing at least one of the terminal of the first laser beam 11 and the terminal of the second laser beam 12 with the pulse duration smaller than 100 fs. That is, the compression factor of the laser source apparatus 100 may be greater than 10.

Figure 2:
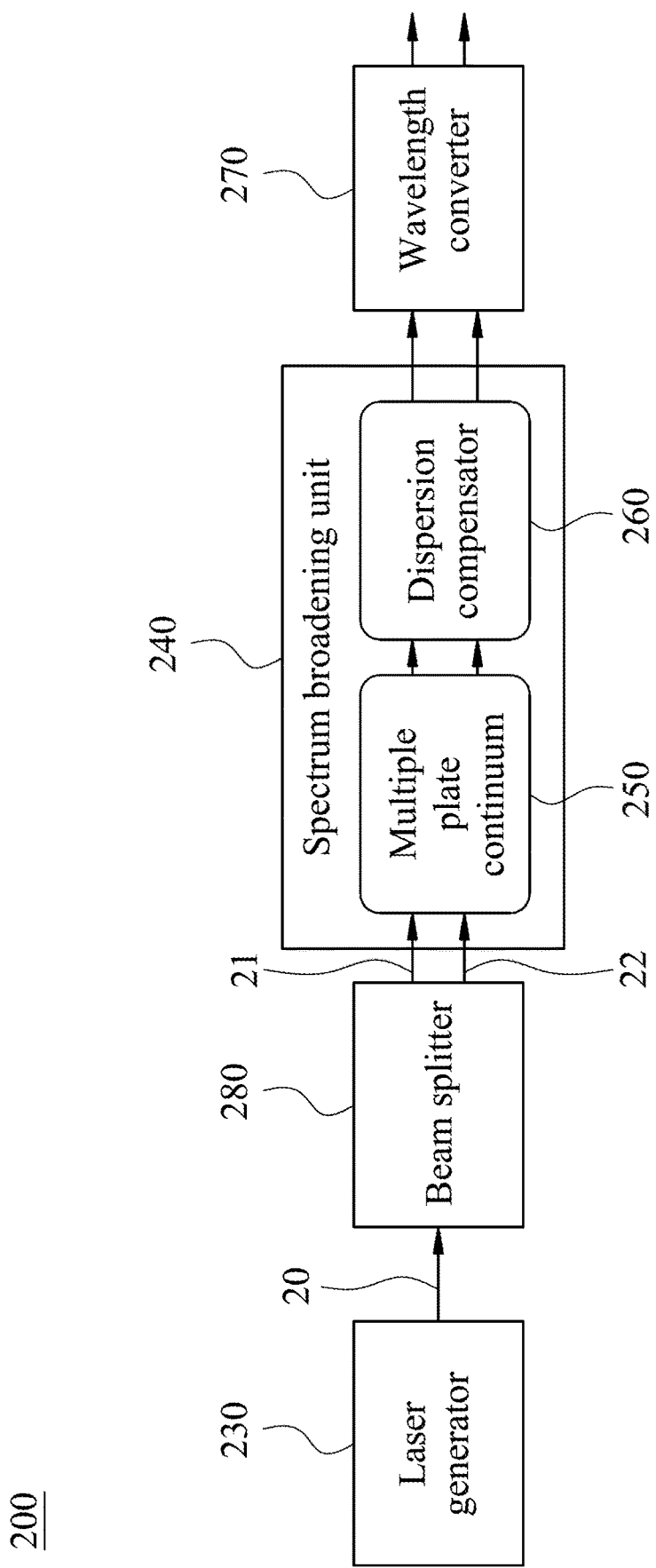
FIG. 2 is a block diagram of a laser source apparatus according to the 2nd embodiment of the present disclosure.

FIG. 2 is a block diagram of a laser source apparatus 200 according to the 2nd embodiment of the present disclosure, and also a schematic view of the laser source apparatus 200, which is configured to generate a first laser beam 21 and a second laser beam 22. With reference to FIG. 2, the laser source apparatus 200 is for providing a beam path (label omitted) to generate the first laser beam 21 and the second laser beam 22. The laser source apparatus 200 includes a laser generator 230, a spectrum broadening unit 240 and a beam splitter 280 on the beam path.

The laser generator 230 is configured to generate an original laser beam 20 with a pulse duration smaller than 1 ps. The spectrum broadening unit 240 is configured in a following stage of the laser generator 230. The spectrum broadening unit 240 includes a multiple plate continuum 250. The multiple plate continuum 250 includes a plurality of thin plates and is configured to broaden a spectrum. The thin plates are configured along the beam path in order. The beam splitter 280 is configured in the following stage of the laser generator 230 to divide the original laser beam 20 into the first laser beam 21 and the second laser beam 22.

In the 2nd embodiment, the spectrum broadening unit 240 includes the multiple plate continuum 250 and a dispersion compensator 260 along the beam path in order. The laser source apparatus 200 further includes a wavelength converter 270 on the beam path. The wavelength converter 270 is configured in the following stage of the laser generator 230 and to convert the spectrum.

Specifically, the laser source apparatus 200 includes the laser generator 230, the beam splitter 280, the spectrum broadening unit 240 and the wavelength converter 270 along the beam path in order. The original laser beam 20 is divided into the first laser beam 21 and the second laser beam 22 after passing through the beam splitter 280, and then at least one of the first laser beam 21 and the second laser beam 22 passes through the spectrum broadening unit 240 and the wavelength converter 270 in order. The spectrum broadening unit 240 includes the multiple plate continuum 250 and the dispersion compensator 260 along the beam path in order. Moreover, it should be understood that a number of the spectrum broadening unit of the laser source apparatus 200 may be at least two, the at least two spectrum broadening units are configured along the beam path in order, and optical properties of each of the original laser beam 20, the first laser beam 21 and the second laser beam 22 emitted from different optical elements on the beam path may be different.

In the 2nd embodiment, the laser generator 230 with a gain medium doped with Yb is configured to generate the original laser beam 20 with the pulse duration smaller than 1 ps. The beam splitter 280 is a surface reflector. The dispersion compensator 260 is a chirped mirror. The wavelength converter 270 is a second harmonic generator.

The laser source apparatus 200 is for providing at least one of a terminal of the first laser beam 21 and a terminal of the second laser beam 22 with a pulse duration smaller than 300 fs.

Figure 3:
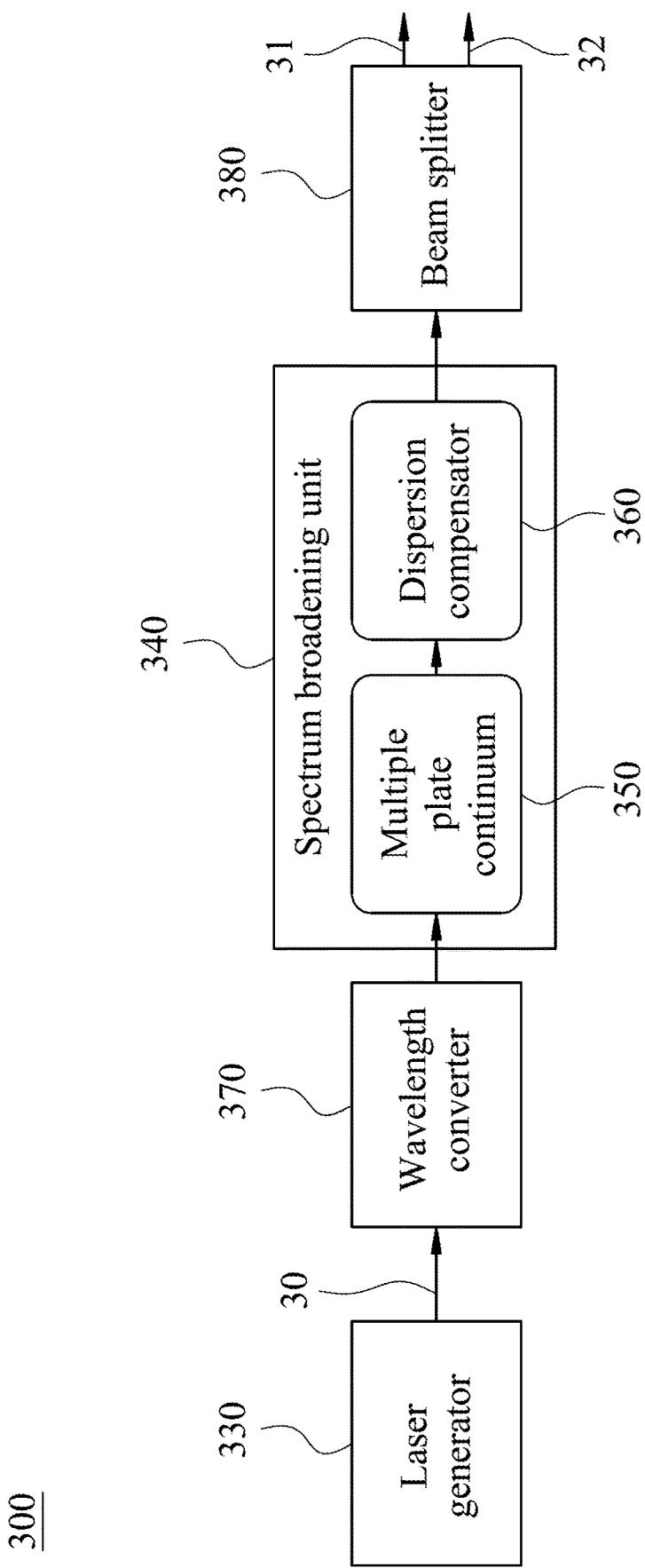
FIG. 3 is a block diagram of a laser source apparatus according to the 3rd embodiment of the present disclosure.

FIG. 3 is a block diagram of a laser source apparatus 300 according to the 3rd embodiment of the present disclosure, and also a schematic view of the laser source apparatus 300, which is configured to generate a first laser beam 31 and a second laser beam 32. With reference to FIG. 3, the laser source apparatus 300 is for providing a beam path (label omitted) to generate the first laser beam 31 and the second laser beam 32. The laser source apparatus 300 includes a laser generator 330, a spectrum broadening unit 340 and a beam splitter 380 on the beam path.

The laser generator 330 is configured to generate an original laser beam 30 with a pulse duration smaller than 1 ps. The spectrum broadening unit 340 is configured in a following stage of the laser generator 330. The spectrum broadening unit 340 includes a multiple plate continuum 350. The multiple plate continuum 350 includes a plurality of thin plates and is configured to broaden a spectrum. The thin plates are configured along the beam path in order. The beam splitter 380 is configured in the following stage of the laser generator 330 to divide the original laser beam 30 into the first laser beam 31 and the second laser beam 32.

In the 3rd embodiment, the spectrum broadening unit 340 includes the multiple plate continuum 350 and a dispersion compensator 360 along the beam path in order. The laser source apparatus 300 further includes a wavelength converter 370 on the beam path. The wavelength converter 370 is configured in the following stage of the laser generator 330 and to convert the spectrum. The beam splitter 380 is configured in a following stage of the spectrum broadening unit 340 and the wavelength converter 370.

Specifically, the laser source apparatus 300 includes the laser generator 330, the wavelength converter 370, the spectrum broadening unit 340 and the beam splitter 380 along the beam path in order. The spectrum broadening unit 340 includes the multiple plate continuum 350 and the dispersion compensator 360 along the beam path in order. The original laser beam 30 is divided into the first laser beam 31 and the second laser beam 32 after passing through the beam splitter 380. Moreover, it should be understood that a number of the spectrum broadening unit of the laser source apparatus 300 may be at least two, the at least two spectrum broadening units are configured along the beam path in order, and optical properties of each of the original laser beam 30, the first laser beam 31 and the second laser beam 32 emitted from different optical elements on the beam path may be different.

In the 3rd embodiment, the laser generator 330 with a gain medium doped with Yb is configured to generate the original laser beam 30 with the pulse duration smaller than 1 ps. The beam splitter 380 is a surface reflector. The dispersion compensator 360 is a chirped mirror. The wavelength converter 370 is a second harmonic generator.

The laser source apparatus 300 is for providing at least one of a terminal of the first laser beam 31 and a terminal of the second laser beam 32 with a pulse duration smaller than 300 fs.

Figure 4:
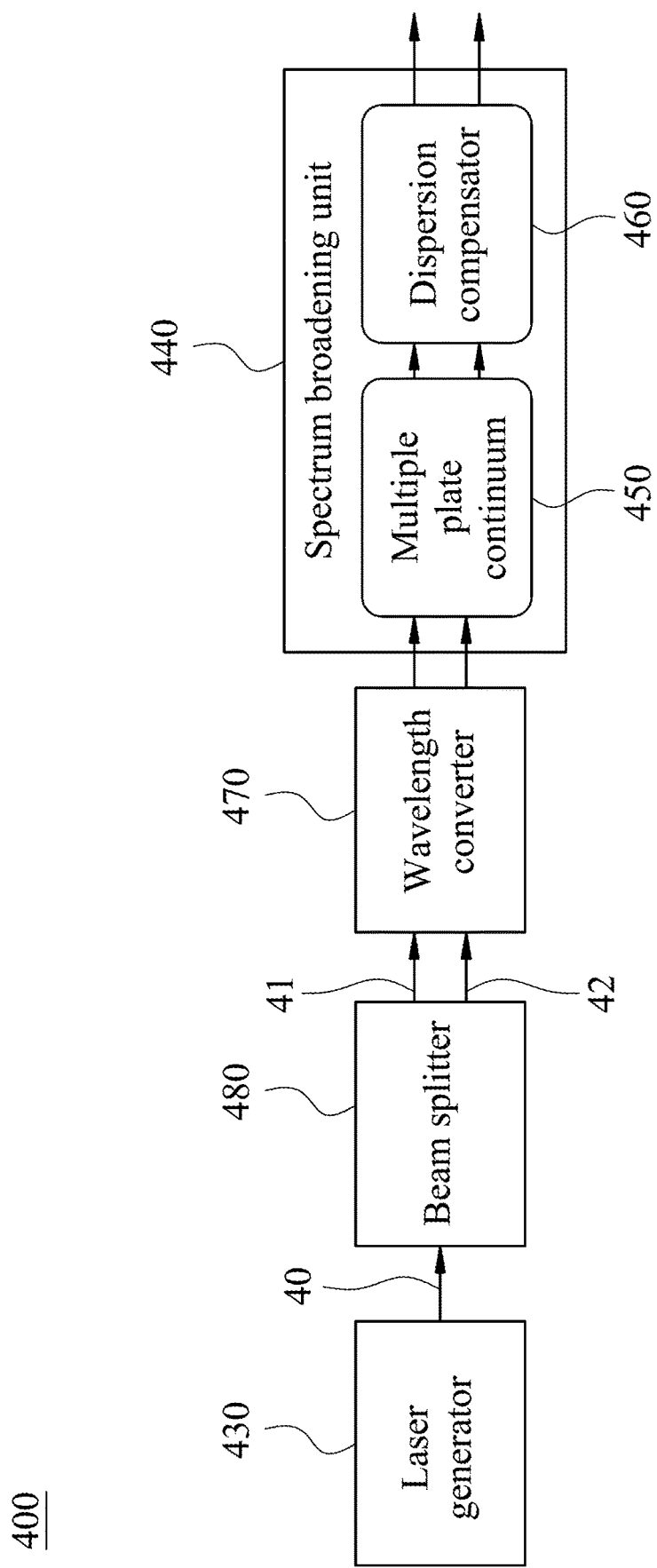
FIG. 4 is a block diagram of a laser source apparatus according to the 4th embodiment of the present disclosure.

FIG. 4 is a block diagram of a laser source apparatus 400 according to the 4th embodiment of the present disclosure, and also a schematic view of the laser source apparatus 400, which is configured to generate a first laser beam 41 and a second laser beam 42. With reference to FIG. 4, the laser source apparatus 400 is for providing a beam path (label omitted) to generate the first laser beam 41 and the second laser beam 42. The laser source apparatus 400 includes a laser generator 430, a spectrum broadening unit 440 and a beam splitter 480 on the beam path.

The laser generator 430 is configured to generate an original laser beam 40 with a pulse duration smaller than 1 ps. The spectrum broadening unit 440 is configured in a following stage of the laser generator 430. The spectrum broadening unit 440 includes a multiple plate continuum 450. The multiple plate continuum 450 includes a plurality of thin plates and is configured to broaden a spectrum. The thin plates are configured with Brewster's angles along the beam path in order. The beam splitter 480 is configured in the following stage of the laser generator 430 to divide the original laser beam 40 into the first laser beam 41 and the second laser beam 42.

In the 4th embodiment, the spectrum broadening unit 440 includes the multiple plate continuum 450 and a dispersion compensator 460 along the beam path in order. The laser source apparatus 400 further includes a wavelength converter 470 on the beam path. The wavelength converter 470 is configured in the following stage of the laser generator 430 and to convert the spectrum.

Specifically, the laser source apparatus 400 includes the laser generator 430, the beam splitter 480, the wavelength converter 470 and the spectrum broadening unit 440 along the beam path in order. The original laser beam 40 is divided into the first laser beam 41 and the second laser beam 42 after passing through the beam splitter 480, and then at least one of the first laser beam 41 and the second laser beam 42 passes through the wavelength converter 470 and the spectrum broadening unit 440 in order. The spectrum broadening unit 440 includes the multiple plate continuum 450 and the dispersion compensator 460 along the beam path in order. Moreover, it should be understood that a number of the spectrum broadening unit of the laser source apparatus 400 may be at least two, the at least two spectrum broadening units are configured along the beam path in order, and optical properties of each of the original laser beam 40, the first laser beam 41 and the second laser beam 42 emitted from different optical elements on the beam path may be different.

In the 4th embodiment, the laser generator 430 with a gain medium doped with Yb is configured to generate the original laser beam 40 with the pulse duration smaller than 1 ps. The beam splitter 480 is a surface reflector. The dispersion compensator 460 is a chirped mirror. The wavelength converter 470 is a second harmonic generator.

The laser source apparatus 400 is for providing at least one of a terminal of the first laser beam 41 and a terminal of the second laser beam 42 with a pulse duration smaller than 300 fs.

Figure 5:
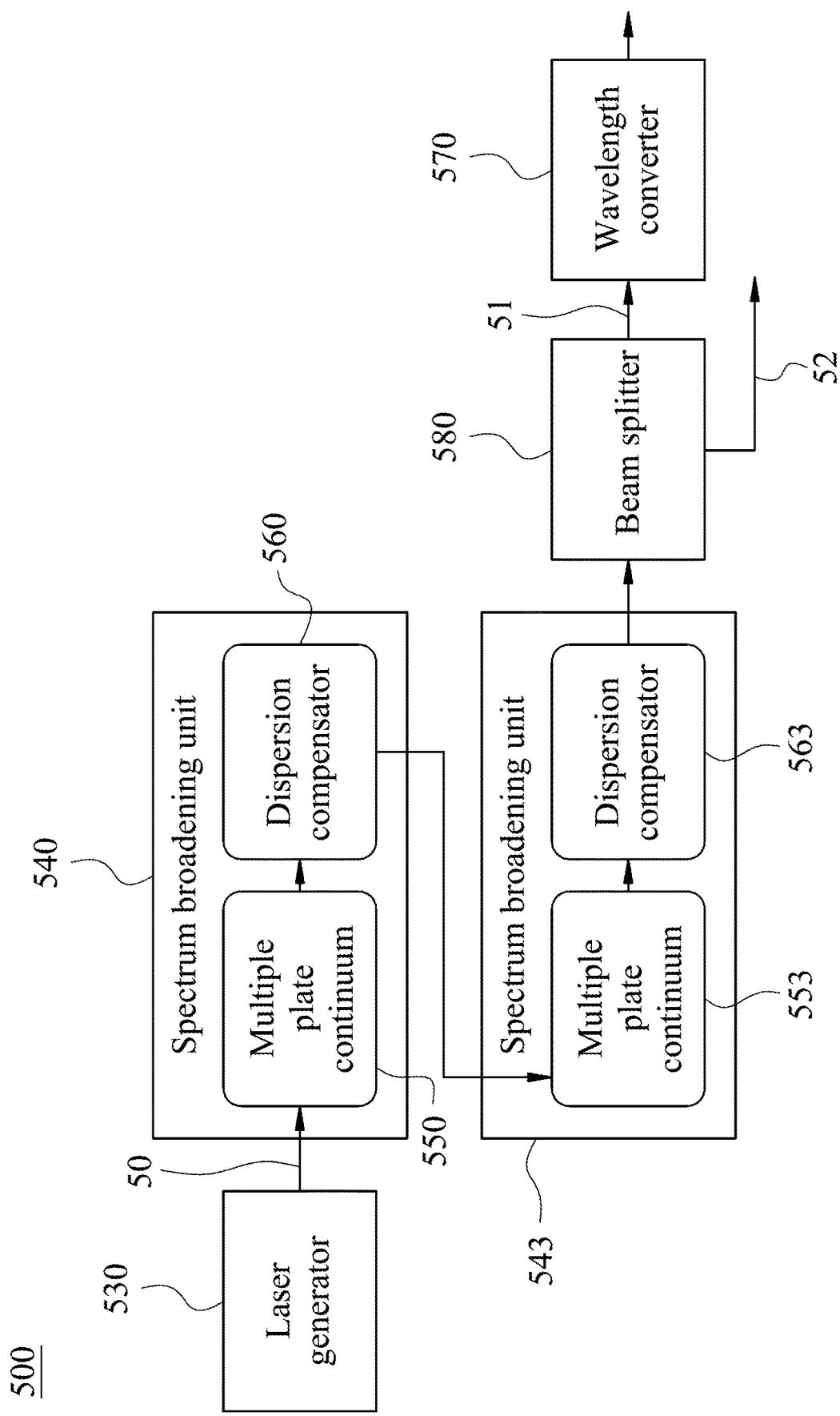
FIG. 5 is a block diagram of a laser source apparatus according to the 5th embodiment of the present disclosure.

FIG. 5 is a block diagram of a laser source apparatus 500 according to the 5th embodiment of the present disclosure, and also a schematic view of the laser source apparatus 500, which is configured to generate a first laser beam 51 and a second laser beam 52. With reference to FIG. 5, the laser source apparatus 500 is for providing a beam path (label omitted) to generate the first laser beam 51 and the second laser beam 52. The laser source apparatus 500 includes a laser generator 530, spectrum broadening units 540, 543 and a beam splitter 580 on the beam path.

The laser generator 530 is configured to generate an original laser beam 50 with a pulse duration smaller than 1 ps. The spectrum broadening units 540, 543 are configured in a following stage of the laser generator 530 along the beam path in order. The spectrum broadening unit 540 includes a multiple plate continuum 550. The multiple plate continuum 550 includes a plurality of thin plates 555 and is configured to broaden a spectrum. The thin plates 555 are configured along the beam path in order, as shown in FIG. 7B. The spectrum broadening unit 543 includes a multiple plate continuum 553. The multiple plate continuum 553 includes a plurality of thin plates 555 and is configured to broaden a spectrum. The thin plates 555 are configured along the beam path in order, as shown in FIG. 7B. The beam splitter 580 is configured in the following stage of the laser generator 530 to divide the original laser beam 50 into the first laser beam 51 and the second laser beam 52.

In the 5th embodiment, the spectrum broadening unit 540 includes the multiple plate continuum 550 and a dispersion compensator 560 along the beam path in order, and the spectrum broadening unit 543 includes the multiple plate continuum 553 and a dispersion compensator 563 along the beam path in order. Therefore, the multiple plate continuum 550 and the dispersion compensator 560 cooperated, and the multiple plate continuum 553 and the dispersion compensator 563 further cooperated are favorable for shortening the pulse duration, so as to increase the resolution in the time domain. When the laser source apparatus 500 is applied to imaging-related technologies (e.g., a nonlinear microscope), it is beneficial to increase the time resolution and further enhance the overall measurement sensitivity. A conventional technology combining microscopy and ultrafast technology to achieve high resolution in space and time simultaneously requires a higher sensitivity, and thereby needs an ultrafast laser system with a high repetition rate. However, the conventional system with the high repetition rate cannot satisfy both a high pulse intensity and an ultrashort pulse duration. The spectrum broadening units 540, 543 cooperated with the laser generator 530 with a high repetition rate of the laser source apparatus 500 according to the present disclosure can effectively solve the problem.

The laser source apparatus 500 further includes a wavelength converter 570 on the beam path. The wavelength converter 570 is configured in the following stage of the laser generator 530 and to convert the spectrum.

The spectrum broadening units 540, 543, the beam splitter 580 and the wavelength converter 570 are configured in the following stage of the laser generator 530 in order. The wavelength converter 570 is for converting at least one of a spectrum of the first laser beam 51 and a spectrum of the second laser beam 52. Accordingly, the first laser beam 51 and the second laser beam 52 with different required wavelengths can be provided by the beam path and the devices or elements therein with lower complexity.

Specifically, the laser source apparatus 500 includes the laser generator 530, the spectrum broadening units 540, 543, the beam splitter 580 and the wavelength converter 570 along the beam path in order. The spectrum broadening unit 540 includes the multiple plate continuum 550 and the dispersion compensator 560 along the beam path in order. The spectrum broadening unit 543 includes the multiple plate continuum 553 and the dispersion compensator 563 along the beam path in order. The original laser beam 50 is divided into the first laser beam 51 and the second laser beam 52 after passing through the beam splitter 580, and then at least one of the first laser beam 51 and the second laser beam 52 passes through the wavelength converter 570. Moreover, it should be understood that optical properties of each of the original laser beam 50, the first laser beam 51 and the second laser beam 52 emitted from different optical elements on the beam path may be different. In other embodiment according to the present disclosure (not shown in drawings), a laser source apparatus includes a laser generator, at least one spectrum broadening unit, a beam splitter and a wavelength converter along a beam path in order. Specifically, a number of the at least one spectrum broadening unit of a laser source apparatus may be one. Alternately, a number of at least one spectrum broadening unit of a laser source apparatus may be at least three, and the at least three spectrum broadening units are configured along a beam path in order.

In the 5th embodiment, the laser generator 530 with a gain medium doped with Yb is configured to generate the original laser beam 50 with the pulse duration smaller than 1 ps. The beam splitter 580 is a surface reflector. Each of the dispersion compensators 560, 563 is a chirped mirror. The wavelength converter 570 is a second harmonic generator.

The laser source apparatus 500 is for providing at least one of a terminal of the first laser beam 51 and a terminal of the second laser beam 52 with a pulse duration smaller than 300 fs.

Figure 6A:
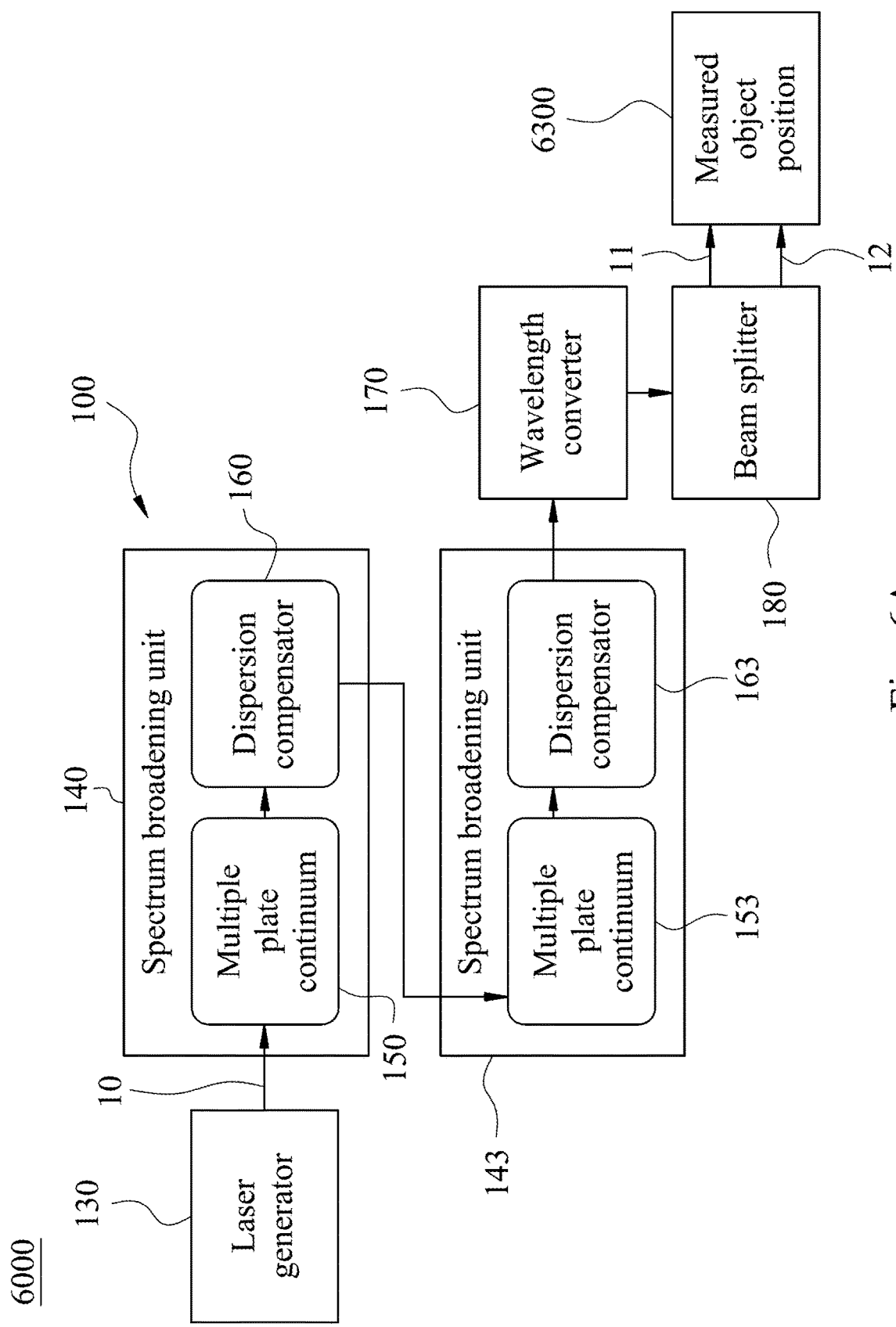
FIG. 6A is a block diagram of a measurement system according to the 6th embodiment of the present disclosure.
Figure 6B:
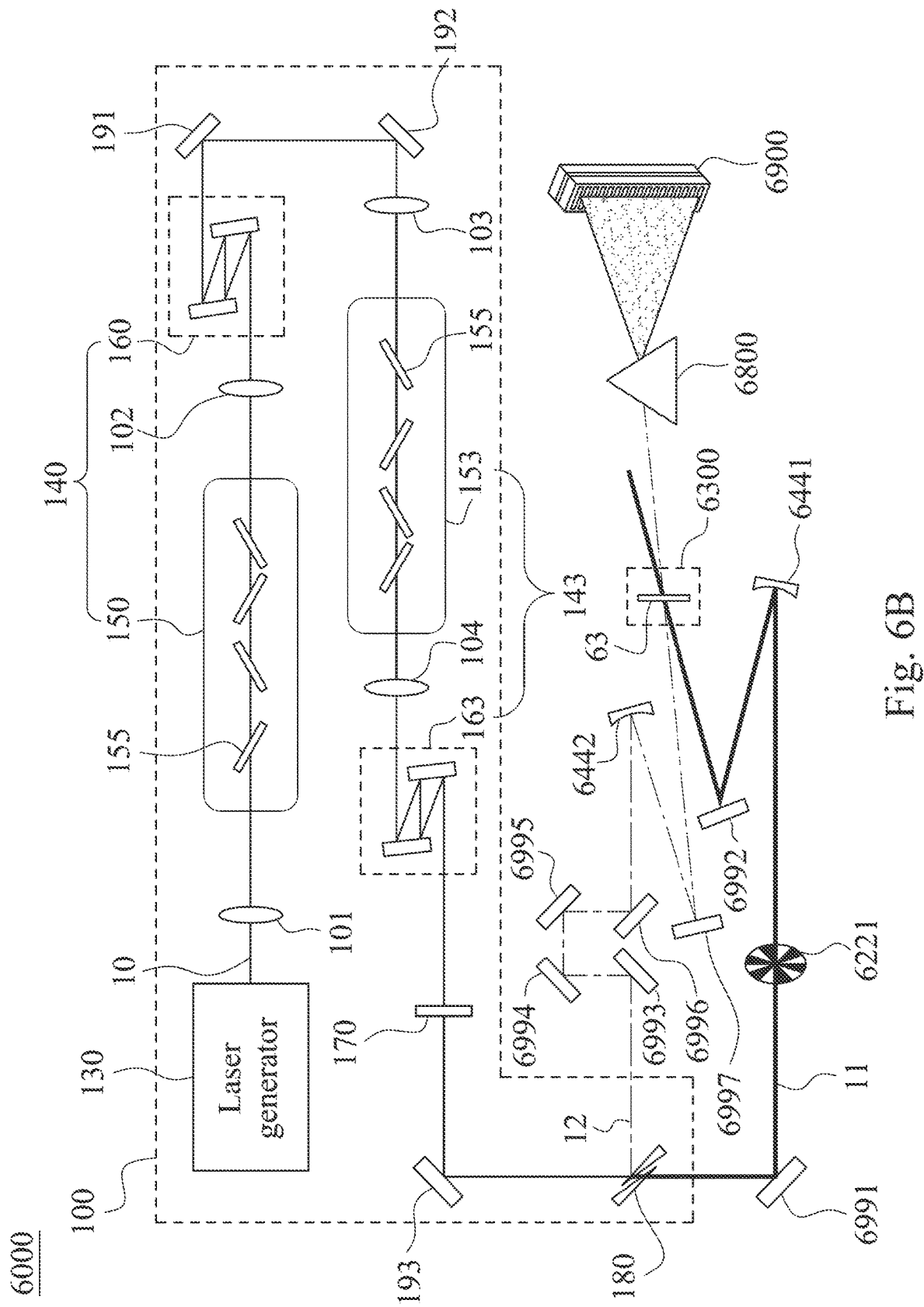
FIG. 6B is a configuration diagram of the measurement system according to the 6th embodiment.

FIG. 6A is a block diagram of a measurement system 6000 according to the 6th embodiment of the present disclosure. FIG. 6B is a configuration diagram of the measurement system 6000 according to the 6th embodiment. With reference to FIG. 6A and FIG. 6B, the measurement system 6000 is for providing the beam path (label omitted) to generate the first laser beam 11 and the second laser beam 12. At least one of the first laser beam 11 and the second laser beam 12 is configured to be incident on a sample (device under test, DUT, measured object) 63. The measurement system 6000 includes the laser generator 130, the spectrum broadening units 140, 143, the beam splitter 180 and a sample position 6300. Specifically, the measurement system 6000 includes the laser source apparatus 100 of the aforementioned 1st embodiment and the sample position 6300 along the beam path in order. The contents related to the laser source apparatus 100 according to the 1st embodiment may be referred for the other details of the measurement system 6000 according to the 6th embodiment, which are thereby not described herein.

The laser generator 130 is configured to generate the original laser beam 10 with the pulse duration smaller than 1 ps. The spectrum broadening units 140, 143 are configured in the following stage of the laser generator 130 along the beam path in order. The spectrum broadening unit 140 includes the multiple plate continuum 150. The multiple plate continuum 150 includes the plurality of thin plates 155 and is configured to broaden the spectrum. The thin plates 155 are configured with Brewster's angles along the beam path in order. The spectrum broadening unit 143 includes the multiple plate continuum 153. The multiple plate continuum 153 includes the plurality of thin plates 155 and is configured to broaden the spectrum. The thin plates 155 are configured with Brewster's angles along the beam path in order. The beam splitter 180 is configured in the following stage of the laser generator 130 to divide the original laser beam 10 into the first laser beam 11 and the second laser beam 12. The sample position 6300 is configured in a following stage of the spectrum broadening units 140, 143 and the beam splitter 180. The sample position 6300 is for disposing the sample 63. Accordingly, the measurement system 6000 featured with a high repetition rate is advantageous in effectively shortening the measurement time, improving the signal-to-noise ratio of a high-speed and high repetition rate measurement, and further increasing the stability of the measurement system 6000. The faster measurement speed is beneficial to obtain a large amount of data in a short time for averaging to increase the signal quality. Moreover, the basic limitation of the signal-to-noise ratio of an optical measurement is limited by quantum shot noise. Under shot-noise limited detection, the signal-to-noise ratio is proportional to the square root of the number of photons. Thus, increasing the brightness of the light source is favorable for effectively improving the measurement sensitivity, and the high-brightness light source is favorable for large sampling areas measurement, and multiple objects or samples measurement in the same time. In addition, the laser generator 130 may be configured to generate the original laser beam 10 with the pulse duration smaller than 500 fs. In other measurement system according to the present disclosure (not shown in drawings), the measurement system may be for providing a beam path to generate at least three laser beams (a first laser beam, a second laser beam, a third laser beam or more laser beams).

In detail, the spectrum broadening unit 140 includes the multiple plate continuum 150 and the dispersion compensator 160 along the beam path in order, and the spectrum broadening unit 143 includes the multiple plate continuum 153 and the dispersion compensator 163 along the beam path in order. The number of the spectrum broadening unit of the measurement system 6000 is at least two, and the two spectrum broadening units are specifically the spectrum broadening units 140, 143, respectively. That is, the number of the spectrum broadening units of the measurement system 6000 is specifically two, and the spectrum broadening units 140, 143 are configured along the beam path in order. The measurement system 6000 further includes the wavelength converter 170 on the beam path. The wavelength converter 170 is configured in the following stage of the laser generator 130 and to convert the spectrum. The beam splitter 180 is configured in the following stage of the spectrum broadening units 140, 143 and the wavelength converter 170.

The measurement system 6000 may be for providing the at least one of the first laser beam 11 and the second laser beam 12 with a pulse duration smaller than 300 fs while being incident on the sample 63. Therefore, the measurement system 6000 with lower complexity is advantageous in providing applications of short pulse and supercontinuum. Furthermore, the measurement system 6000 may be for providing the at least one of the first laser beam 11 and the second laser beam 12 with the pulse duration smaller than 100 fs while being incident on the sample 63.

The first laser beam 11 may be for being incident on the sample 63 and exciting the sample 63 to be in an excited state. Accordingly, the first laser beam 11 can be used as a pump laser.

The measurement system 6000 may further include a spectroscope (label omitted) configured in a following stage of the sample position 6300 on the beam path. The spectroscope may specifically include a prism 6800 and a photodetector 6900. The prism 6800 may be replaced by a grating, but not limited thereto. Accordingly, the measurement system 6000 is advantageous in being applied in spectral measurement.

The second laser beam 12 may be for being incident on and passing through the sample 63. A delay time of the second laser beam 12 incident on the sample 63 with respect to the first laser beam 11 incident on the sample 63 may be greater than −100 ps and smaller than 10 ms (millisecond). Therefore, the first laser beam 11 can be used as the pump laser, and the second laser beam 12 can be used as a probe laser. The laser generator 130 is properly selected to generate the original laser beam 10 with a high repetition rate. The laser generator 130 combined with the spectrum broadening units 140, 143 is beneficial to easily tune a wavelength of the pump signal, implement a spatial line scan camera or global camera, fast measure, and thereby effectively prevent from problems related to point light source mapping and excessive measurement time in the conventional technique. In other measurement system according to the present disclosure, it can be used as a measurement system for nonlinear optical imaging, e.g., a coherent Raman spectroscopy, a stimulated Raman scattering microscopy, a stimulated emission microscopy, a pump-probe microscopy, but not limited thereto. Furthermore, the delay time of the second laser beam 12 incident on the sample 63 with respect to the first laser beam 11 incident on the sample 63 may be greater than 0 second and smaller than 10 ms.

The measurement system 6000 is a material measurement system for the sample 63. Therefore, the measurement system 6000 can be used to measure the optical properties at different wavelengths of materials. The wavelength and the pulse width of the ultrafast laser source are limited by the laser gain medium, and thereby the nonlinear effects are required to expand the laser bandwidth. The multiple plate continuum 150, 153 are featured with nonlinear optics resulted from effective wavelength conversion.

In the 6th embodiment, the measurement system 6000 includes the laser generator 130, the spectrum broadening units 140, 143, the wavelength converter 170, the beam splitter 180 and the sample position 6300 along the beam path in order. The spectrum broadening unit 140 includes the multiple plate continuum 150 and the dispersion compensator 160 along the beam path in order. The spectrum broadening unit 143 includes the multiple plate continuum 153 and the dispersion compensator 163 along the beam path in order. Focal lenses 101, 102, 103, 104 and planar mirrors 191, 192, 193 may be configured between the laser generator 130 and the beam splitter 180 on the beam path, as shown in FIG. 6B, but not limited thereto.

The original laser beam 10 is divided into the first laser beam 11 and the second laser beam 12 after passing through the beam splitter 180. The first laser beam 11 used as the pump laser is for being incident on the sample 63 and exciting the sample 63 to be in the excited state. A light source modulator (e.g., an optical chopper) 6221, planar mirrors 6991, 6992 and a concave mirror 6441 may be configured between the beam splitter 180 and the sample position 6300 on the beam path for providing the first laser beam 11, as shown in FIG. 6B, but not limited thereto. The second laser beam 12 used as the probe laser is for being incident on and passing through the sample 63. Planar mirrors 6993, 6994, 6995, 6996, 6997 and a concave mirror 6442 may be configured between the beam splitter 180 and the sample position 6300 on the beam path for providing the second laser beam 12, as shown in FIG. 6B, but not limited thereto.

It can be configured that the beam path providing the second laser beam 12 is longer than the beam path providing the first laser beam 11, so that the delay time of the second laser beam 12 incident on the sample 63 with respect to the first laser beam 11 incident on the sample 63 can be greater than 0 second and smaller than 100 ps. The prism 6800 and the photodetector 6900 of the spectroscope are configured in a following stage of the sample position 6300 in order. The prism 6800 may be replaced by a grating, but not limited thereto. The photodetector 6900 may specifically include a charge coupled device (CCD). Thus, the measurement system 6000 can be used as the material measurement system for the sample 63. For example, first the first laser beam 11 is used to excite the sample 63 to be in the excited state, and then the spectrum response of the second laser beam 12 with the continuous spectrum after passing through the sample 63 is measured. Moreover, it should be understood that the optical properties of each of the original laser beam 10, the first laser beam 11 and the second laser beam 12 emitted from different optical elements on the beam path may be different, and the prism 6800 and the photodetector 6900 of the spectroscope may be integrated into a single device, or remained as two separated elements, respectively.

In the 6th embodiment, the laser generator 130 with the gain medium doped with Yb is configured to generate the original laser beam 10 with the pulse duration smaller than 1 ps. The beam splitter 180 is the surface reflector. Each of the dispersion compensators 160, 163 is the chirped mirror. The wavelength converter 170 is the second harmonic generator.

Figure 6C:
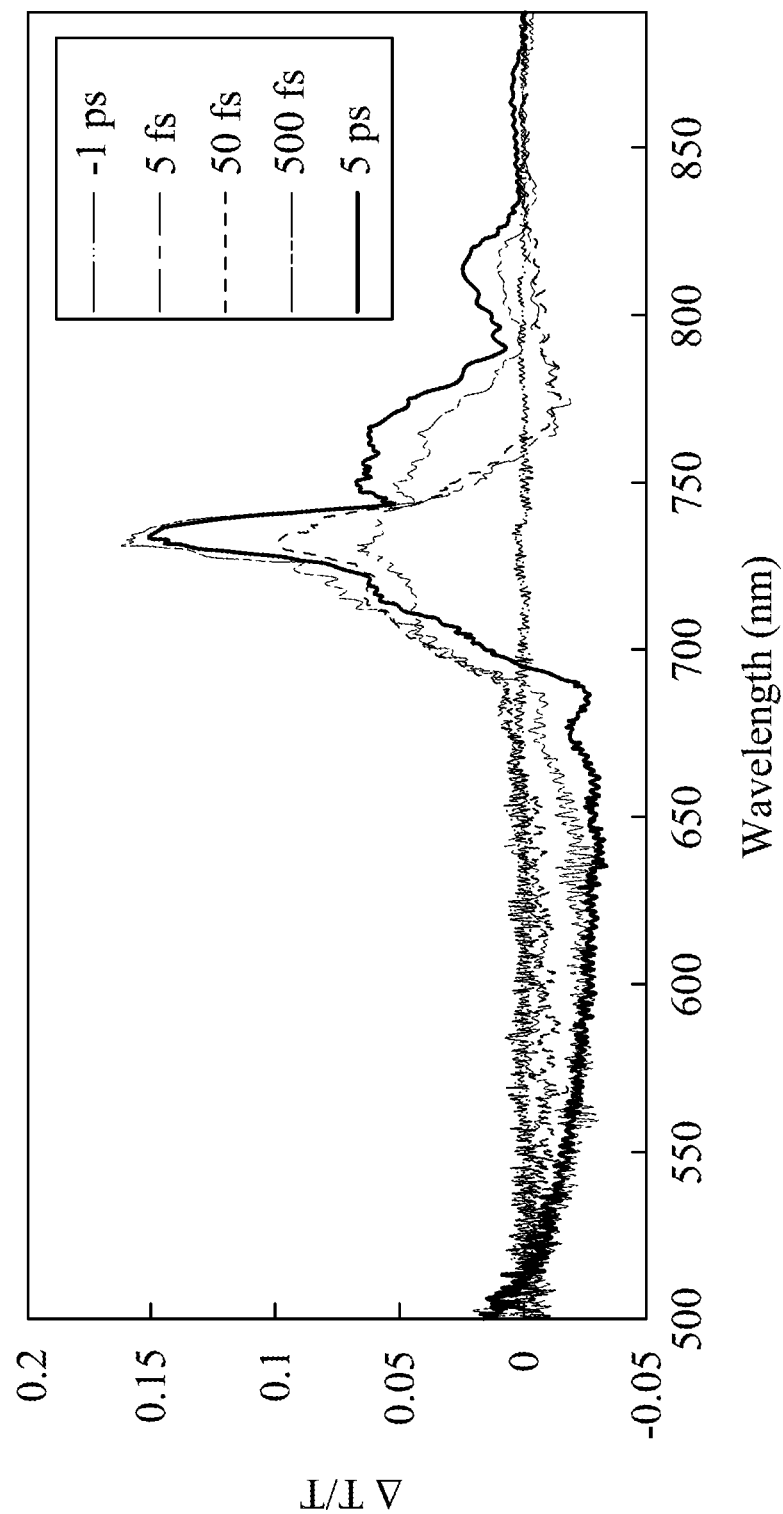
FIG. 6C is a measurement result of the measurement system according to the 6th embodiment.
Figure 6D:
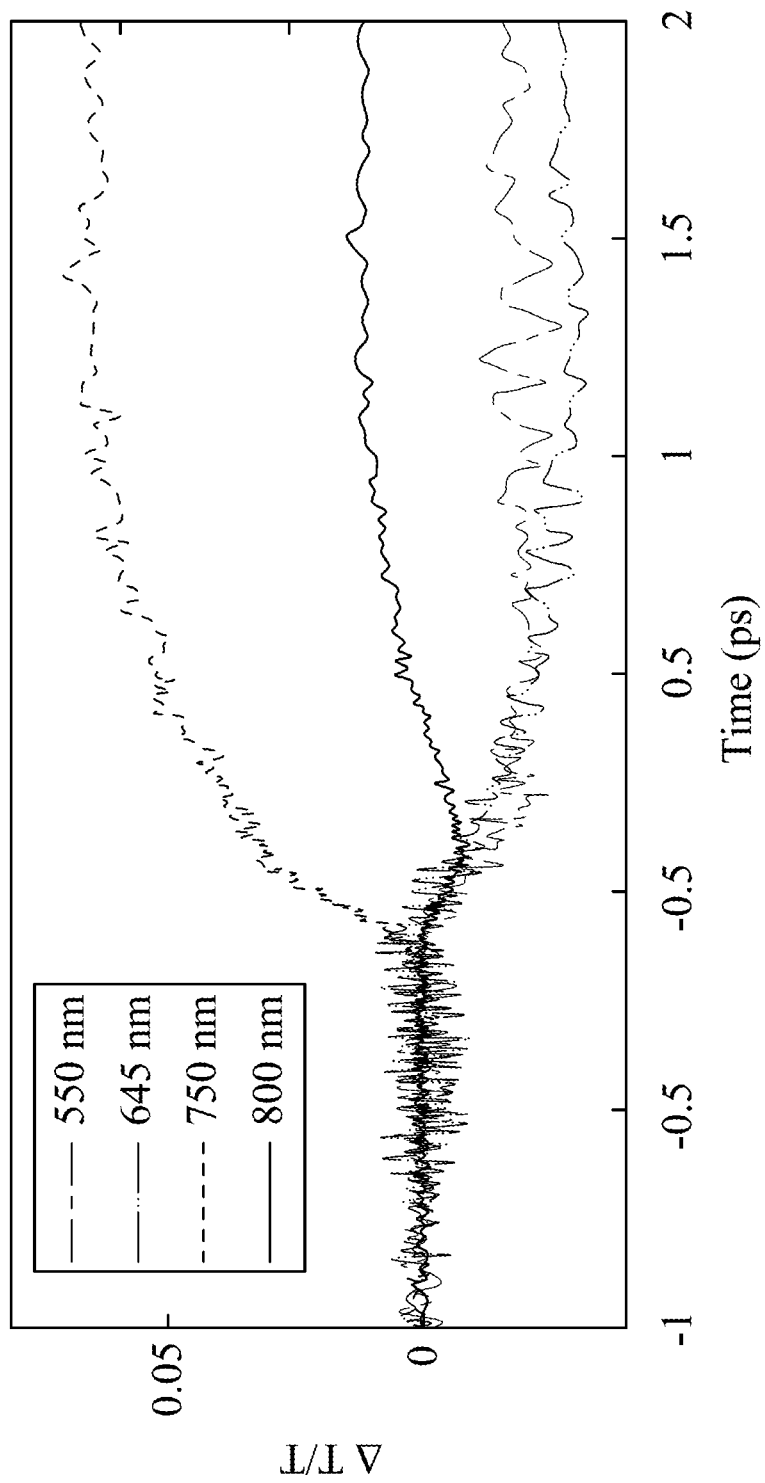
FIG. 6D is another measurement result of the measurement system according to the 6th embodiment.

FIG. 6C is a measurement result of the measurement system 6000 according to the 6th embodiment. FIG. 6D is another measurement result of the measurement system 6000 according to the 6th embodiment. The measurement system 6000 is specifically the material measurement system for the sample 63. The first laser beam 11 used as the pump laser is configured to excite the sample 63 to be in the excited state, and the second laser beam 12 is used as the probe laser. For example, as the data curves shown in FIG. 6C, the delay times of the second laser beam 12 incident on the sample 63 with respect to the first laser beam 11 incident on the sample 63 are respectively −1 ps, 5 fs, 50 fs, 500 fs and 5 ps. The vertical axis represents a ratio of an intensity difference of the second laser beam 12 between after and before exciting the sample 63 with respect to an intensity of the second laser beam 12 before exciting the sample 63. The horizontal axis represents wavelength. The delay time of −1 ps indicates that the second laser beam 12 incident on the sample 63 is before the first laser beam 11 incident on the sample 63. That is, the sample 63 has not been excited to be in the excited state while the second laser beam 12 incident thereon, and thereby the data curve of the delay time of −1 ps can be a background data curve for other data curves.

For further example, as shown in FIG. 6D, the horizontal axis represents time, and the time of 0 ps indicates a time of the second laser beam 12 just passing through the sample 63. The vertical axis represents a ratio of an intensity difference of the second laser beam 12 between the marked time and before exciting the sample 63 with respect to an intensity of the second laser beam 12 before exciting the sample 63. The data curves in FIG. 6D respectively indicate intensities in the time domain of wavelength components of 550 nm, 645 nm, 750 nm and 800 nm of the second laser beam 12.

Figure 7A:
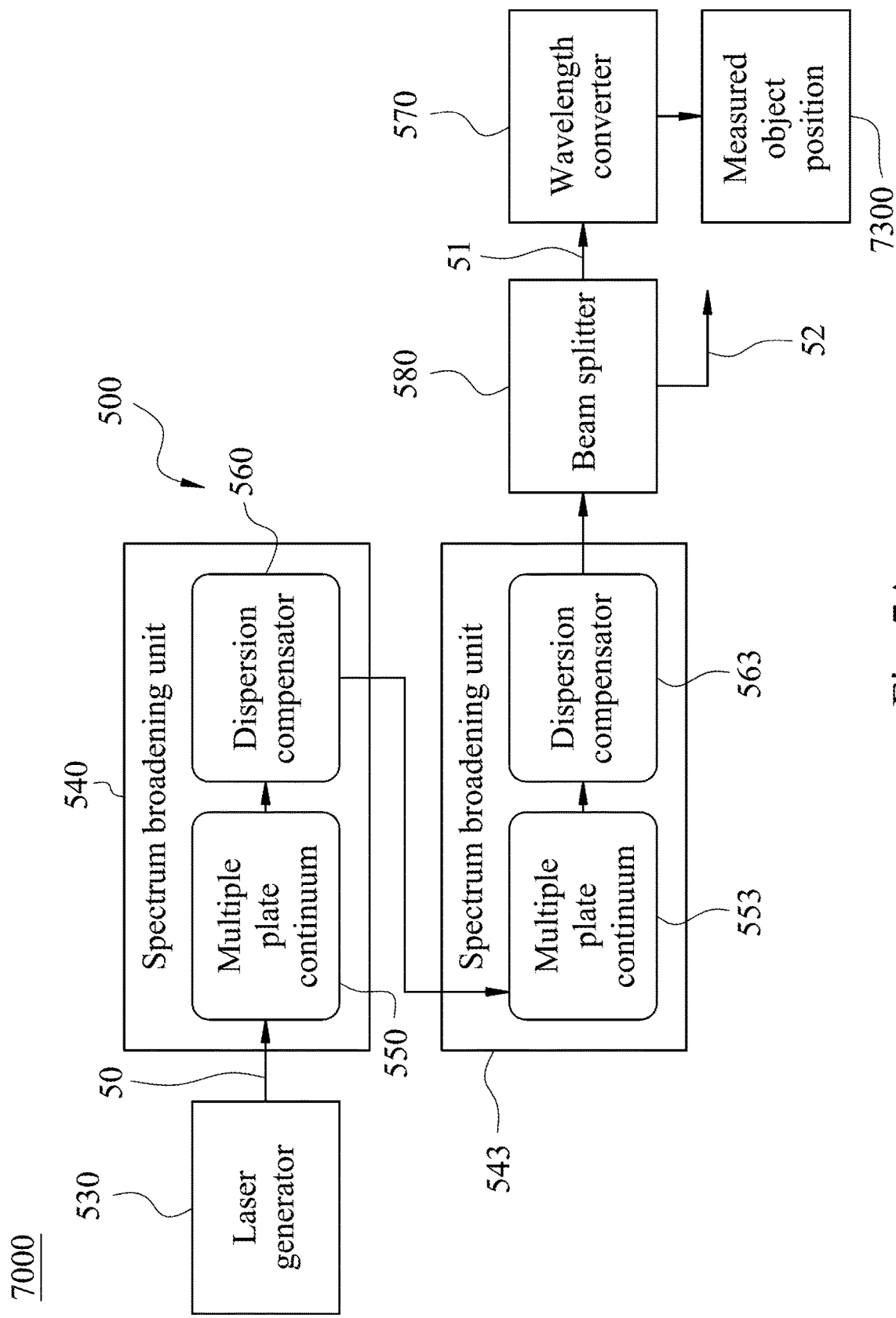
FIG. 7A is a block diagram of a measurement system according to the 7th embodiment of the present disclosure.
Figure 7B:
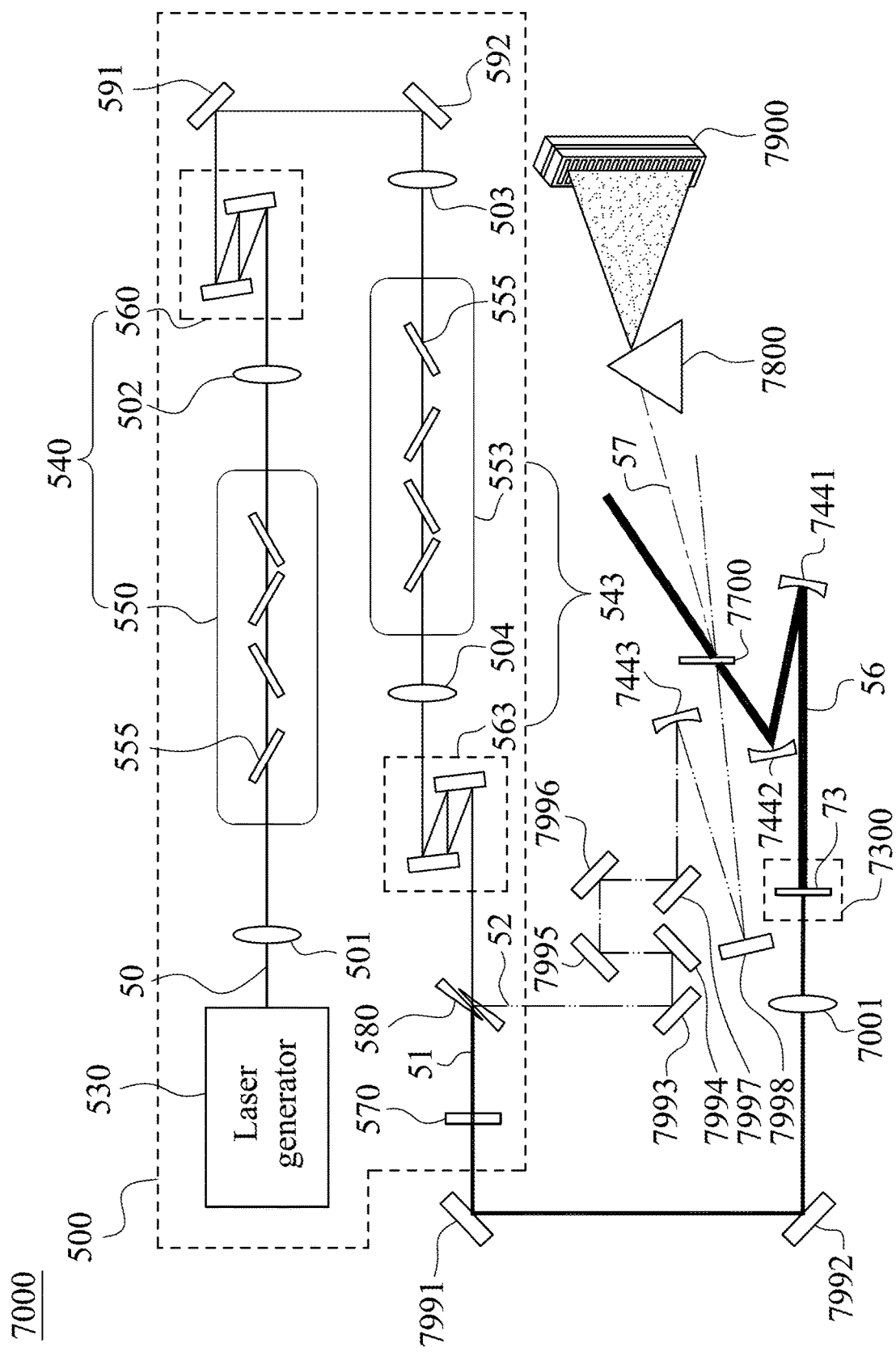
FIG. 7B is a configuration diagram of the measurement system according to the 7th embodiment.

FIG. 7A is a block diagram of a measurement system 7000 according to the 7th embodiment of the present disclosure. FIG. 7B is a configuration diagram of the measurement system 7000 according to the 7th embodiment. With reference to FIG. 7A and FIG. 7B, the measurement system 7000 is for providing the beam path (label omitted) to generate the first laser beam 51 and the second laser beam 52. At least one of the first laser beam 51 and the second laser beam 52 is configured to be incident on a sample 73. The measurement system 7000 includes the laser generator 530, the spectrum broadening units 540, 543, the beam splitter 580 and a sample position 7300. Specifically, the measurement system 7000 includes the laser source apparatus 500 of the aforementioned 5th embodiment and the sample position 7300 along the beam path in order. The contents related to the laser source apparatus 500 according to the 5th embodiment may be referred for the other details of the measurement system 7000 according to the 7th embodiment, which are thereby not described herein.

The laser generator 530 is configured to generate the original laser beam 50 with the pulse duration smaller than 1 ps. The spectrum broadening units 540, 543 are configured in the following stage of the laser generator 530 along the beam path in order. The spectrum broadening unit 540 includes the multiple plate continuum 550. The multiple plate continuum 550 includes the plurality of thin plates 555 and is configured to broaden the spectrum. The thin plates 555 are configured along the beam path in order. The spectrum broadening unit 543 includes the multiple plate continuum 553. The multiple plate continuum 553 includes the plurality of thin plates 555 and is configured to broaden the spectrum. The thin plates 555 are configured along the beam path in order. The beam splitter 580 is configured in the following stage of the laser generator 530 to divide the original laser beam 50 into the first laser beam 51 and the second laser beam 52. The sample position 7300 is configured in a following stage of the spectrum broadening units 540, 543 and the beam splitter 580. The sample position 7300 is for disposing the sample 73.

In detail, the spectrum broadening unit 540 includes the multiple plate continuum 550 and the dispersion compensator 560 along the beam path in order, and the spectrum broadening unit 543 includes the multiple plate continuum 553 and the dispersion compensator 563 along the beam path in order. The measurement system 7000 further includes the wavelength converter 570 on the beam path. The wavelength converter 570 is configured in the following stage of the laser generator 530 and to convert the spectrum. The spectrum broadening units 540, 543, the beam splitter 580 and the wavelength converter 570 are configured in the following stage of the laser generator 530 in order. The wavelength converter 570 is for converting at least one of the spectrum of the first laser beam 51 and the spectrum of the second laser beam 52. Specifically, the wavelength converter 570 is for converting the spectrum of the first laser beam 51.

The measurement system 7000 is for providing the at least one of the first laser beam 51 and the second laser beam 52 with a pulse duration smaller than 300 fs while being incident on the sample 73.

The first laser beam 51 is for being incident on the sample 73 and exciting the sample 73 to be in an excited state. That is, the first laser beam 51 can be used as a pump laser. The measurement system 7000 further includes a spectroscope (label omitted) configured in a following stage of the sample position 7300 on the beam path. The spectroscope may specifically include a prism 7800 and a photodetector 7900.

The first laser beam 51 is for exciting the sample 73 to emit a signal 56 (an excited signal, e.g., a fluorescent signal, but not limited thereto). The measurement system 7000 further includes an up-conversion crystal 7700 configured in a following stage of the sample position 7300 on the beam path. The signal 56 and the second laser beam 52 are for being incident on, and overlapped spatially and temporally in the up-conversion crystal 7700. A portion of the signal 56 is converted to an up-conversion signal 57 by nonlinearly mixing with the second laser beam 52 in the up-conversion crystal 7700. Accordingly, the measurement system 7000 can be applied to ultrafast time-resolved spectroscopy. The pulses of the first laser beam 51 and the pulses of the second laser beam 52 can have different wavelengths. The sample 73 can emit a light (e.g., a fluorescent light) due to its material property after the first laser beam 51 being incident on the sample 73. Next, the time-resolved signal (e.g., fluorescent signal) of the sample 73 can be measured by the nonlinear optical gate driven by the second laser beam 52.

The measurement system 7000 is a photoluminescence measurement system for the sample 73. Accordingly, the measurement system 7000 can be applied to ultrafast time-resolved spectroscopy. The pulses of the first laser beam 51 and the pulses of the second laser beam 52 can have different wavelengths. The sample 73 can emit a light (e.g., a fluorescent light) due to its material property after the first laser beam 51 being incident on the sample 73. Next, the time-resolved signal (e.g., fluorescent signal) of the sample 73 can be measured by the nonlinear optical gate driven by the second laser beam 52.

In FIG. 7B of the 7th embodiment, the measurement system 7000 includes the laser generator 530, the spectrum broadening units 540, 543, the beam splitter 580, the wavelength converter 570 and the sample position 7300 along the beam path in order. The spectrum broadening unit 540 includes the multiple plate continuum 550 and the dispersion compensator 560 along the beam path in order. The spectrum broadening unit 543 includes the multiple plate continuum 553 and the dispersion compensator 563 along the beam path in order. Focal lenses 501, 502, 503, 504 and planar mirrors 591, 592 may be configured between the laser generator 530 and the beam splitter 580 on the beam path, as shown in FIG. 7B, but not limited thereto.

The original laser beam 50 is divided into the first laser beam 51 and the second laser beam 52 after passing through the beam splitter 580, and then the first laser beam 51 is configured to be incident on the wavelength converter 570 and the sample 73 in order. The first laser beam 51 used as the pump laser is configured to be incident on the sample 73, and to excite the sample 73 to be in the excited state to emit a signal 56. The signal 56 is configured to be incident on the up-conversion crystal 7700. A focal lens 7001, planar mirrors 7991, 7992 and concave mirrors 7441, 7442 may be configured between the beam splitter 580 and the up-conversion crystal 7700 on the beam path for providing the first laser beam 51, as shown in FIG. 7B, but not limited thereto. The second laser beam 52 is configured to be incident on the up-conversion crystal 7700. Planar mirrors 7993, 7994, 7995, 7996, 7997, 7998 and concave mirrors 7443 may be configured between the beam splitter 580 and the up-conversion crystal 7700 on the beam path for providing the second laser beam 52, as shown in FIG. 7B, but not limited thereto.

In the 7th embodiment, it can be configured that the beam path providing the second laser beam 52 is substantially as long as the beam path providing the first laser beam 51, so that the delay time of the second laser beam 52 incident on the up-conversion crystal 7700 with respect to the first laser beam 51 incident on the up-conversion crystal 7700 can be substantially equal to 0 second, and the portion of the signal 56 is converted to the up-conversion signal 57 after passing through the up-conversion crystal 7700. That is, the second laser beam 52 can be adjusted to be overlapped spatially and temporally with the signal 56 (e.g., the fluorescent signal), which is from the sample 73 excited by the first laser beam 51, in the up-conversion crystal 7700 to generate the up-conversion signal 57. The prism 7800 and the photodetector 7900 of the spectroscope are configured in a following stage of the up-conversion crystal 7700 in order. The prism 7800 may be replaced by a grating. The photodetector 7900 may specifically include a charge coupled device. The photodetector 7900 may be configured to measure a change over time of the up-conversion signal 57, and thereby the measurement system 7000 can be used as the photoluminescence measurement system for the sample 73. Moreover, it should be understood that the optical properties of each of the original laser beam 50, the first laser beam 51 and the second laser beam 52 emitted from different optical elements on the beam path may be different.

In the 7th embodiment, the laser generator 530 with the gain medium doped with Yb is configured to generate the original laser beam 50 with the pulse duration smaller than 1 ps. The beam splitter 580 is the surface reflector. Each of the dispersion compensators 560, 563 is the chirped mirror. The wavelength converter 570 is the second harmonic generator.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A laser source apparatus, for providing a beam path to generate a first laser beam and a second laser beam, on the beam path, the laser source apparatus comprising:
   a laser generator configured to generate an original laser beam with a pulse duration smaller than 1 ps;
   at least one spectrum broadening unit configured in a following stage of the laser generator, wherein the spectrum broadening unit comprises a multiple plate continuum and a dispersion compensator along the beam path in order, the multiple plate continuum comprises a plurality of thin plates, and the thin plates are configured along the beam path in order; and a beam splitter configured in the following stage of the laser generator to divide the original laser beam into the first laser beam and the second laser beam, wherein the multiple plate continuum, the dispersion compensator and the beam splitter are disposed consecutively along the beam path in order, or the beam splitter, the multiple plate continuum and the dispersion compensator are disposed consecutively along the beam path in order.

2. The laser source apparatus of claim 1, wherein the dispersion compensator is a chirped mirror.

3. The laser source apparatus of claim 1, wherein on the beam path, the laser source apparatus further comprises:

a wavelength converter configured in the following stage of the laser generator.

4. The laser source apparatus of claim 3, wherein the beam splitter is a surface reflector or an interferometer, and the wavelength converter is a second harmonic generator.

5. The laser source apparatus of claim 3, wherein a number of the at least one spectrum broadening unit is at least two, and the at least two spectrum broadening units are configured along the beam path in order.

6. The laser source apparatus of claim 5, wherein the beam splitter is configured in a following stage of the at least two spectrum broadening units and the wavelength converter.

7. The laser source apparatus of claim 5, wherein the at least two spectrum broadening units, the beam splitter and the wavelength converter are configured in the following stage of the laser generator in order, and the wavelength converter is for converting at least one of a spectrum of the first laser beam and a spectrum of the second laser beam.

8. The laser source apparatus of claim 1, wherein the laser source apparatus is for providing each of a terminal of the first laser beam and a terminal of the second laser beam with a pulse duration smaller than 300 fs.

9. A measurement system, for providing a beam path to generate a first laser beam and a second laser beam, wherein at least one of the first laser beam and the second laser beam is configured to be incident on a sample, on the beam path, the measurement system comprising:

a laser generator configured to generate an original laser beam with a pulse duration smaller than 1 ps;

at least one spectrum broadening unit configured in a following stage of the laser generator, wherein the spectrum broadening unit comprises a multiple plate continuum and a dispersion compensator along the beam path in order, the multiple plate continuum comprises a plurality of thin plates, and the thin plates are configured along the beam path in order;

a beam splitter configured in the following stage of the laser generator to divide the original laser beam into the first laser beam and the second laser beam, wherein the multiple plate continuum, the dispersion compensator and the beam splitter are disposed consecutively along the beam path in order, or the beam splitter, the multiple plate continuum and the dispersion compensator are disposed consecutively along the beam path in order; and a sample position configured in a following stage of the at least one spectrum broadening unit and the beam splitter, wherein the sample position is for disposing the sample.

10. The measurement system of claim 9, wherein a number of the at least one spectrum broadening unit is at least two, the at least two spectrum broadening units are configured along the beam path in order, and on the beam path, the measurement system further comprises:

a wavelength converter configured in the following stage of the laser generator.

11. The measurement system of claim 10, wherein the beam splitter is configured in a following stage of the at least two spectrum broadening units and the wavelength converter.

12. The measurement system of claim 10, wherein the at least two spectrum broadening units, the beam splitter and the wavelength converter are configured in the following stage of the laser generator in order, and the wavelength converter is for converting at least one of a spectrum of the first laser beam and a spectrum of the second laser beam.

13. The measurement system of claim 9, wherein the measurement system is for providing the at least one of the first laser beam and the second laser beam with a pulse duration smaller than 300 fs while being incident on the sample.

14. The measurement system of claim 9, wherein the first laser beam is for being incident on the sample and exciting the sample to be in an excited state.

15. The measurement system of claim 14, wherein on the beam path, the measurement system further comprises:

a spectroscope configured in a following stage of the sample position.

16. The measurement system of claim 14, wherein the second laser beam is for being incident on and passing through the sample, and a delay time of the second laser beam incident on the sample with respect to the first laser beam incident on the sample is greater than −100 ps and smaller than 10 ms.

17. The measurement system of claim 14, wherein the first laser beam is for exciting the sample to emit a signal, and on the beam path, the measurement system further comprises:

an up-conversion crystal configured in a following stage of the sample position, wherein the signal and the second laser beam are for being incident on and overlapped in the up-conversion crystal, and a portion of the signal is converted to an up-conversion signal by nonlinearly mixing with the second laser beam in the up-conversion crystal.

18. The measurement system of claim 14, wherein the measurement system is a material measurement system or a photoluminescence measurement system for the sample.

* * * * *